US012681684B2

(12) United States Patent
Kim et al.

(10) Patent No.: US 12,681,684 B2
(45) Date of Patent: Jul. 14, 2026

(54) METHOD OF CONTROLLING VOLUME LEVEL OF PERSONALIZED VOICE GUIDANCE BASED ON CHANGES IN POSTURE OF VEHICLE OCCUPANT AND DEVICE THEREFOR

(71) Applicant: HYUNDAI MOBIS CO., LTD., Seoul (KR)

(72) Inventors: Tae Hun Kim, Suwon-si (KR); Ji Soo Shin, Yongin-si (KR); Myung Bin Choi, Seoul (KR); Sung Joon Ahn, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 225 days.

(21) Appl. No.: 18/617,312

(22) Filed: Mar. 26, 2024

(65) Prior Publication Data

US 2025/0021295 A1 Jan. 16, 2025

(30) Foreign Application Priority Data

Jul. 12, 2023 (KR) ........................ 10-2023-0090613

(51) Int. Cl.
*G06F 3/16* (2006.01)
*B60W 50/14* (2020.01)
*G01S 15/08* (2006.01)
*H04R 1/02* (2006.01)

(52) U.S. Cl.
CPC ............. *G06F 3/165* (2013.01); *B60W 50/14* (2013.01); *G01S 15/08* (2013.01); *H04R 1/025* (2013.01); *H04R 2499/13* (2013.01)

(58) Field of Classification Search
CPC ........ G06F 3/165; B60W 50/14; G01S 15/08; H04R 1/025; H04R 2499/13
See application file for complete search history.

(56) References Cited

U.S. PATENT DOCUMENTS

| | | | | |
|---|---|---|---|---|
| 2015/0010169 A1* | 1/2015 | Popova | .................... | H03G 3/20 |
| | | | | 381/107 |
| 2017/0359650 A1* | 12/2017 | Wexler | .................... | H04N 7/185 |
| 2018/0295462 A1* | 10/2018 | Di Censo | ................ | H04S 7/303 |
| 2021/0029452 A1* | 1/2021 | Tsoi | ...................... | H04R 29/001 |
| 2021/0152945 A1* | 5/2021 | Qi | .......................... | H04R 9/066 |
| 2023/0217204 A1* | 7/2023 | Boothe | ................... | H04S 7/303 |
| | | | | 381/301 |
| 2023/0311732 A1* | 10/2023 | Tanabe | ................... | B60N 2/879 |
| | | | | 297/217.3 |

* cited by examiner

*Primary Examiner* — Daniel Samwel

(74) *Attorney, Agent, or Firm* — Morgan Lewis & Bockius LLP

(57) ABSTRACT

Disclosed herein is a method of controlling, by a voice guidance control device according to some embodiments of the present disclosure, a volume level of personalized voice guidance. The method includes: obtaining information on a distance between an occupant of a vehicle and a seat of the vehicle from a signal generated from the vehicle; and outputting voice guidance related to the occupant. A volume level of the voice guidance is adaptively determined based on the information on the distance between the occupant and the seat.

15 Claims, 10 Drawing Sheets

600

Check whether vehicle occupant is seated in seat (610)

↓

Output basic guidance sound through speaker of vehicle seat (620)

↓

Adjust sound volume level of basic guidance sound (630)

↓

Measure distance between vehicle occupant and seat (640)

↓

Adjust volume level of voice guidance (650)

100

500

600

Check whether vehicle occupant is seated in seat (610)

Output basic guidance sound through speaker of vehicle seat (620)

Adjust sound volume level of basic guidance sound (630)

Measure distance between vehicle occupant and seat (640)

Adjust volume level of voice guidance (650)

(a)                    (b)

<u>800</u>

Vibrator

Vibrating plate

Figure 10:
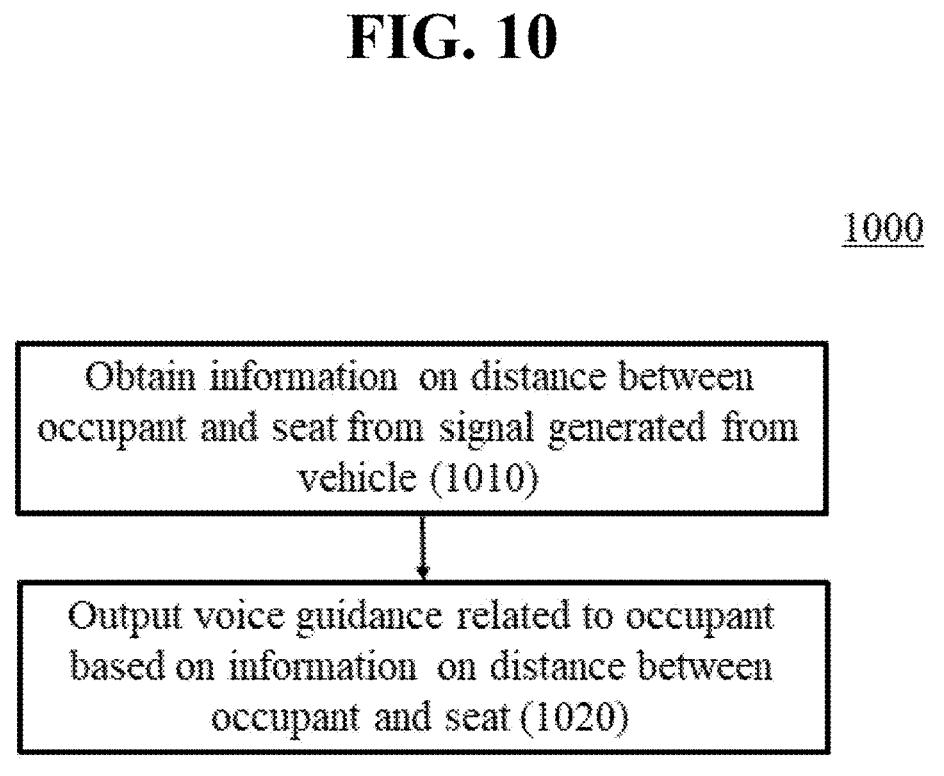

Obtain information on distance between occupant and seat from signal generated from vehicle (1010)

Output voice guidance related to occupant based on information on distance between occupant and seat (1020)

METHOD OF CONTROLLING VOLUME LEVEL OF PERSONALIZED VOICE GUIDANCE BASED ON CHANGES IN POSTURE OF VEHICLE OCCUPANT AND DEVICE THEREFOR

This application claims the benefit of Korean Patent Application No. 10-2023-0090613, filed on Jul. 12, 2023, which is hereby incorporated by reference as if fully set forth herein.

BACKGROUND

Technical Field

The present disclosure relates to a method for controlling the volume level of personalized voice guidance based on changes in the posture of a vehicle occupant, and more particularly to, a method for controlling the volume level of voice guidance to ensure that the voice guidance is fully provided to a vehicle occupant based on the distance between the vehicle occupant and a guidance seat.

Discussion of the Related Art

As research and interest in autonomous vehicles continue to grow, the concept and focus on vehicles are shifting from mobility to utility.

To prevent safety incidents involving occupants while driving, parking, or getting in and out of a vehicle, it is important for each occupant to have an accurate understanding of the situation of the vehicle. To facilitate such awareness, voice guidance may be provided to vehicle occupants.

In particular, individuals with transportation-related disabilities, including those with visual impairments, may need to rely on voice guidance to drive or listen to the voice guidance to respond to situations that occur within the vehicle.

However, if the output voice guidance is not effectively conveyed to the occupants and thus the occupants miss the voice guidance, it may lead to unforeseen difficulties such as safety incidents.

SUMMARY

Accordingly, the present disclosure is directed to a method of controlling the volume level of personalized voice guidance based on changes in the posture of a vehicle occupant and device therefor that substantially obviate one or more problems due to limitations and disadvantages of the related art.

The present disclosure aims to provide a purpose-built vehicle (PBV) capable of offering various beneficial features to occupants.

Specifically, the present disclosure aims to provide a sound control method and device for controlling the volume level of voice guidance based on the posture of vehicle occupants, including individuals with visual impairments, hearing impairments, transportation-related disabilities, or the elderly.

Furthermore, the present disclosure aims to provide personalized voice guidance to occupants inside a vehicle.

The present disclosure is not limited to the objects described above, and other objects that the present disclosure could achieve will be more clearly understood from the following detailed description.

To achieve these objects and other advantages and in accordance with the purpose of the disclosure, as embodied and broadly described herein, there is provided a device configured to control a volume level of personalized voice guidance. The device may include: a distance measuring unit configured to obtain information on a distance between an occupant of a vehicle and a seat of the vehicle from a signal generated from the vehicle; a speaker configured to output voice guidance related to the occupant; and a controller configured to adaptively determine a volume level of the speaker based on the information on the distance between the occupant and the seat measured by the distance measuring unit.

Based on that there are two or more occupants in the vehicle, the controller may output voice guidance personalized for each of the two or more occupants.

The signal generated from the vehicle may include an ultrasonic signal transmitted from the distance measuring unit mounted on the seat of the vehicle, and the distance measuring unit may determine the distance information based on information on a round-trip time of the ultrasonic signal for the occupant.

A location at which the voice guidance is output may be the speaker mounted on the seat.

The speaker may include at least one directional speaker, and the directional speaker may include a vibrator and a vibrating plate.

On the other hand, the vibrator related to concentration of the voice guidance may include two or more bone conduction speakers, and the concentration of the voice guidance may be determined based on a spacing between the bone conduction speakers.

The vibrating plate related to sound quality of the voice guidance may include carbon fibers.

In another aspect of the present disclosure, provided herein is a method of controlling, by a voice guidance control device, a volume level of personalized voice guidance. The method may include: obtaining information on a distance between an occupant of a vehicle and a seat of the vehicle from a signal generated from the vehicle; and outputting voice guidance related to the occupant. A volume level of the voice guidance may be adaptively determined based on the information on the distance between the occupant and the seat.

There may be two or more occupants in the vehicle, and the voice guidance may be voice guidance personalized for each of the two or more occupants.

The signal generated from the vehicle may include an ultrasonic signal transmitted from a device mounted on the seat of the vehicle, and the distance information may be determined based on information on a round-trip time of the ultrasonic signal for the occupant.

A location at which the voice guidance is output may correspond to a speaker mounted on the seat.

A speaker may include at least one directional speaker, and the directional speaker may include a vibrator and a vibrating plate.

On the other hand, the vibrator related to concentration of the voice guidance may include two or more bone conduction speakers, and the concentration of the voice guidance may be determined based on a spacing between the bone conduction speakers.

The vibrating plate related to sound quality of the voice guidance may include carbon fibers.

According to some embodiments of the present disclosure, a purpose-built vehicle (PBV) capable of providing various useful configurations to occupants may be implemented.

According to some embodiments of the present disclosure, even if the distance between a vehicle occupant and a vehicle seat changes due to changes in the posture of the vehicle occupant, voice guidance may be fully provided to the vehicle occupant by adjusting the volume level of the voice guidance.

In addition, each occupant seated in the vehicle may be provided with personalized voice guidance. Thus, each occupant may take reasonable action to reduce the risk of accidents.

The effects of the present disclosure are not limited to what has been described above, and other effects may be inferred from embodiments of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 10 is a diagram schematically illustrating a method of controlling the volume level of personalized voice guidance based on the distance between an occupant and a vehicle seat according to some embodiments of the present disclosure.

DETAILED DESCRIPTION

Hereinafter, exemplary implementations of the present disclosure will be described with reference to attached drawings. The detailed explanation provided below, along with the attached drawings, is intended to describe the exemplary implementations of the present disclosure and is not meant to represent the only embodiments capable of being implemented according to the present disclosure. The following detailed explanation includes specific details to provide a comprehensive understanding of the present disclosure. However, it is evident to those skilled in the art that the present disclosure is capable of being implemented without the specific details.

In various examples of the present disclosure, "/" and "," should be interpreted as representing "and/or." For example, "A/B" may mean "A and/or B." In addition, "A, B" may mean "A and/or B." Additionally, "A/B/C" may mean "at least one of A, B, and/or C," and "A, B, C" may mean "at least one of A, B, and/or C."

Hereinafter, embodiments of the present disclosure will be described in detail one by one.

Figure 1:
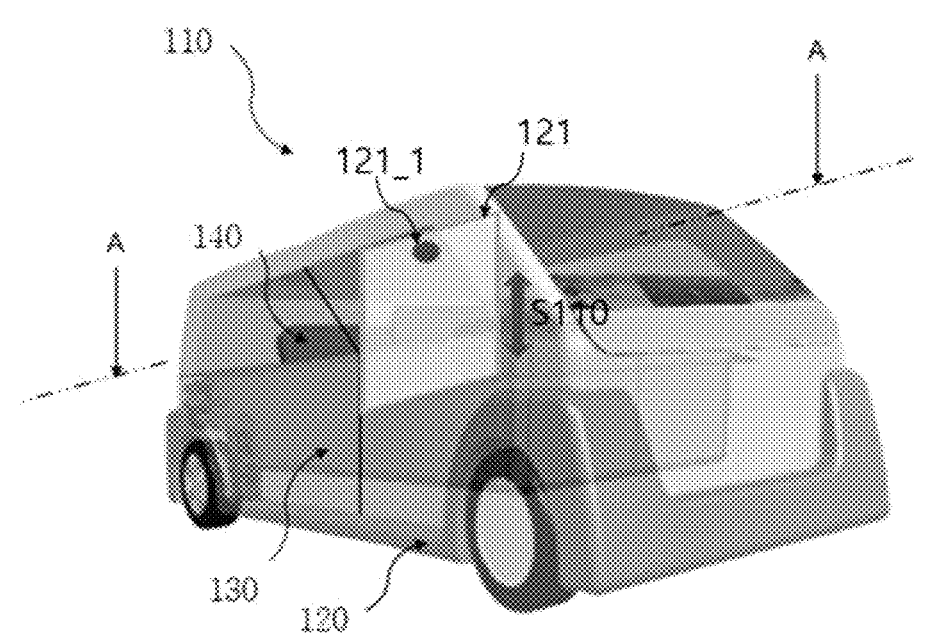
FIG. 1 is a diagram illustrating a purpose-built vehicle (PBV) according to some embodiments of the present disclosure.

FIG. 1 is a diagram illustrating a purpose-built vehicle (PBV) according to an embodiment of the present disclosure.

In one aspect of the present disclosure, a PBV for providing various convenience structures to occupants is provided.

FIG. 1 is a diagram illustrating a PBV according to an embodiment of the present disclosure.

Referring to FIG. 1, a PBV 110 may include a skateboard 120, a cabin 130, and a seat 140 located within the cabin 130.

The skateboard 120 forms the floor surface of the vehicle.

The cabin 130 may be coupled to the top of the skateboard 120, providing both an occupant space and a separate storage space.

For instance, due to the low floor of the cabin 130, the seat 140 needs to be adjusted to a higher position where the visibility line of a driver is secured. This allows for an additional storage space to be created underneath the seat 140 located in the occupant space of the cabin 130.

Figure 2:
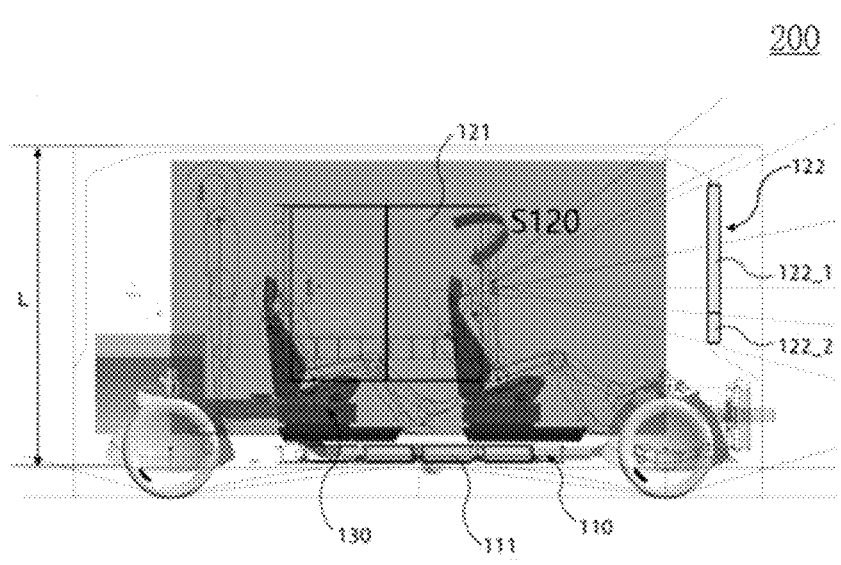
FIG. 2 is a side cross-sectional view showing the cross section A-A shown in FIG. 1.

FIG. 2 is a side cross-sectional view showing the cross section A-A shown in FIG. 1.

Referring to FIG. 2, a battery storage space 111 may be provided on the skateboard 120. It is desirable for the battery storage space 111 to be designed in consideration for battery installation (not shown) and control precision.

For the convenience of occupants, it is desirable that the cabin 130 is configured to adjust the recline of the seat 140 and rotate independently. In particular, the overall height (L) of the cabin 130 may be designed to a level where occupants are capable of standing comfortably.

In this case, the height (L) of the cabin 130 may also be adjustable according to separate control.

A side display 121 installed in the cabin 130 may output entertainment screens and other information images for infotainment purposes. The side display 121 may be positioned near a door where passengers board and provide necessary information to a passenger when the passenger enters the vehicle. The side display 121 may be configured to recognize the direction of the face of the passenger through image capture devices such as a camera 121_1. To this end, the side display 121 may be configured such that the side display 121 moves up and down (S110) depending on the height of the passenger as shown in FIG. 1. The vertical movement may be activated as the passenger approaches the vehicle and a terminal carried by the passenger is recognized by the vehicle.

The side display 121 according to an embodiment of the present disclosure may switch from an external display mode to an internal display mode after a passenger boards. FIG. 2 illustrates an example in which the side display 121 rotates (S120) to provide an internal display to passengers.

A windshield 122 may have a display form that selectively displays images toward the interior and exterior of the vehicle.

The windshield 122 may include an electrochromic image area 122_1 and an opaque image area 122_2.

The electrochromic image area 122_1 may adjust shading such that images are selectively displayed towards the inside or outside of the vehicle depending on power supply.

The opaque image area 122_2 may extend upward or downward from the electrochromic image area 122_1.

As another example, the windshield 122 may be divided into an internal display area and an external display area.

For example, the internal display area may display images toward the interior of the vehicle, and the external display area may display images toward the exterior of the vehicle. In this case, the internal and external display areas may have different electrical supply paths.

Figure 3:
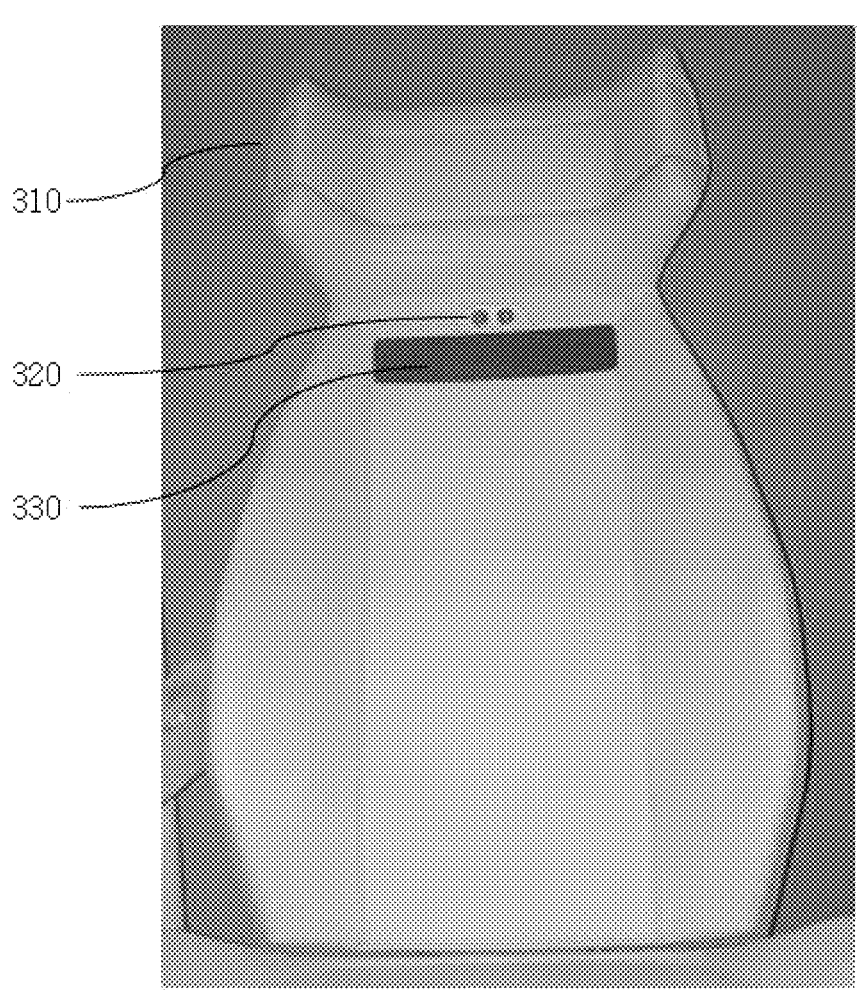
FIG. 3 is a diagram schematically illustrating the configuration of a voice guidance control device mounted on a vehicle seat according to the present disclosure.

FIG. 3 is a diagram schematically illustrating the configuration of a voice guidance control device mounted on a vehicle seat according to the present disclosure.

The voice guidance control device may include a speaker 330, a distance measuring unit 320, and a controller.

The voice guidance control device may be mounted on the vehicle and provide personalized voice guidance to each vehicle occupant. For example, the voice guidance control device may be mounted inside the backrest of each vehicle seat 310 of the vehicle. In the present disclosure, it is assumed that the voice guidance control device is mounted inside the vehicle seat 310.

Personalized voice guidance may be provided to a vehicle occupant from the speaker 330 at the rear of the vehicle from the moment the vehicle occupant boards the vehicle until the vehicle occupant disembarks. The distance between the speaker 330 and the occupant may vary depending on the posture of the occupant in the vehicle. The volume level of the voice guidance perceived by the vehicle occupant may vary depending on changes in the distance. The distance between the occupant and the speaker or vehicle seat may be measured using an ultrasonic signal transmitted from the distance measuring unit 320. The controller controls the volume level of the voice guidance based on information on the distance measured by the distance measuring unit 320.

Figure 4:
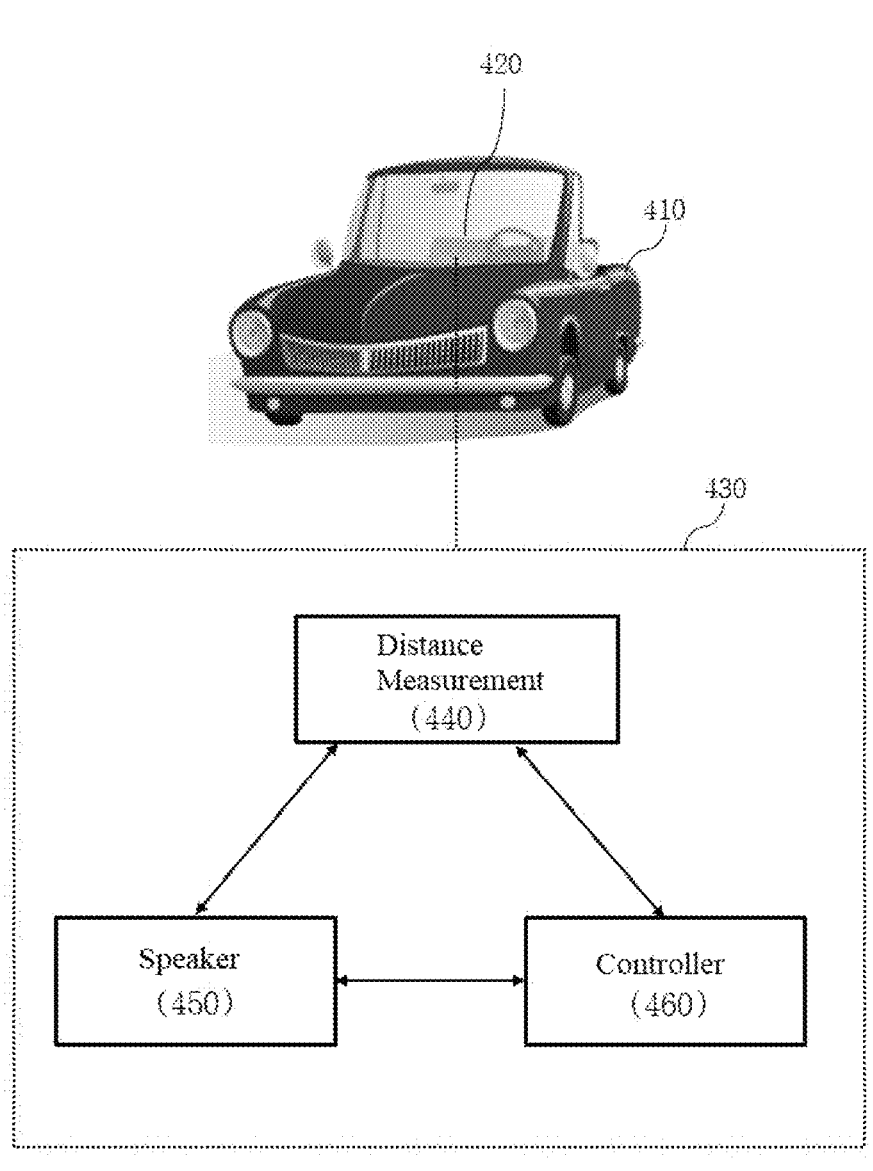
FIG. 4 is a diagram illustrating in detail the configuration of a voice guidance control device according to the present disclosure.

FIG. 4 is a diagram illustrating in detail the configuration of a voice guidance control device according to the present disclosure.

The voice guidance control device 430 may include a distance measuring unit 440 configured to measure the distance between a vehicle occupant and a vehicle seat 420; a speaker 450 configured to output voice guidance to the vehicle occupant; and a controller 460 configured to control the volume level of the voice guidance based on the distance information obtained by the distance measuring unit 440.

The distance measuring unit 440 may measure distance information on the distance between the vehicle occupant and the vehicle seat 420. The distance information may be measured based on the round-trip time of an ultrasonic wave transmitted from the distance measuring unit 440. The distance measuring unit 440 may include an ultrasonic sensor and a memory. The memory may store programs for the operations of the controller 460 and temporarily or permanently store input/output data. The memory may include at least one type of storage medium such as a random access memory (RAM), static random access memory (SRAM), read-only memory (ROM), electrically erasable programmable read-only memory (EEPROM), programmable read-only memory (PROM), magnetic memory, magnetic disk, optical disk, hard disk, micro multimedia card, flash memory, or card-type memory (e.g., secure digital (SD) memory, extreme digital (XD) memory, etc.).

In addition, the memory may store various functions and algorithms, as well as a variety of data, applications, software, commands, and codes necessary for operating and controlling devices.

The speaker 450 configured to output the voice guidance to the vehicle occupant may be composed of a vibrator and a vibrating plate. The vibrator may include a bone conduction speaker, and the vibrating plate may include carbon fibers. The bone conduction speaker may also be referred to as a surface conduction speaker. The configuration of the speaker will be described in detail in FIGS. 8 and 9 below.

The controller 460 may control the overall operations of the voice guidance control device 430. The controller 460 may execute one or more programs stored in the memory. The controller 460 may refer to a central processing unit (CPU), a graphics processing unit (GPU), or a dedicated processor for performing methods according to some embodiments of the present disclosure.

In some embodiments, to effectively provide the voice guidance to the vehicle occupant, at least one controller 460 may control the volume level of the voice guidance outputted from the speaker 450 based on the information on the distance between the vehicle occupant and the vehicle seat 420, which is measured by the distance measuring unit 440.

Figure 5:
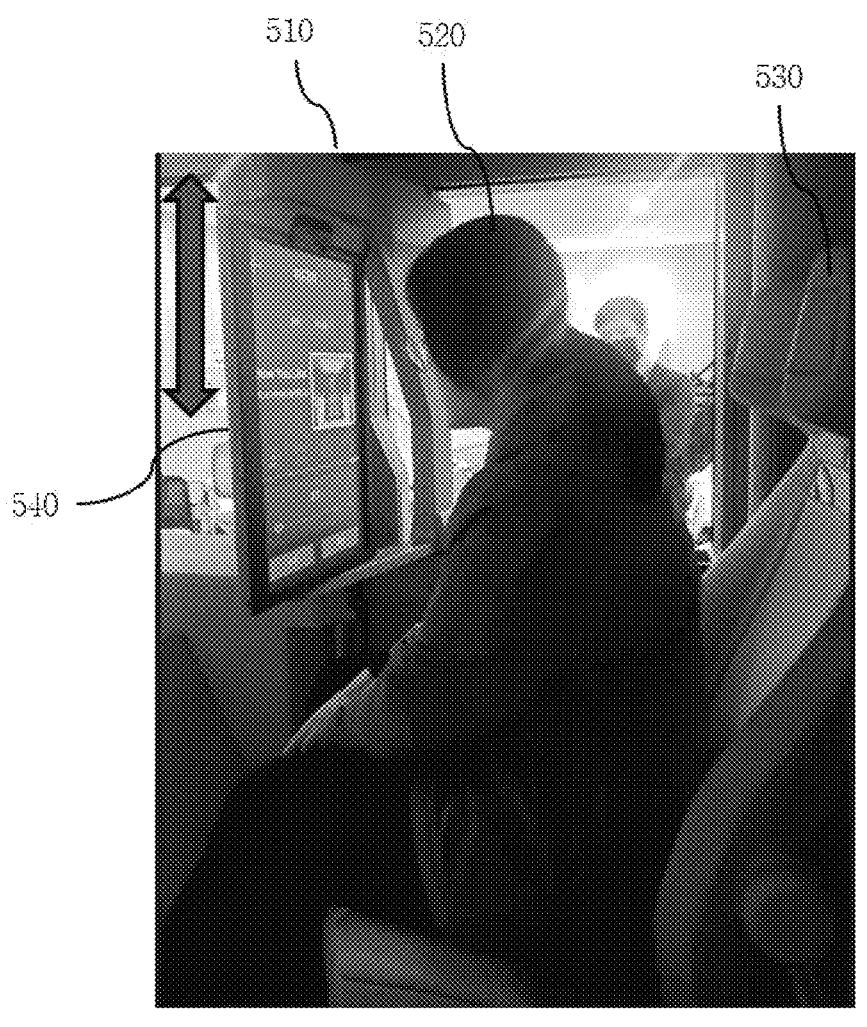
FIG. 5 is a diagram illustrating the operation of a display device installed in a vehicle with a vehicle occupant according to some embodiments of the present disclosure.

FIG. 5 is a diagram illustrating the operation of a display device installed in a vehicle with a vehicle occupant according to some embodiments of the present disclosure.

Specifically, FIG. 5 shows an example in which a vehicle occupant 520 seats on a seat 530 of a vehicle 510 equipped with a display device 540 for providing visual information on the vehicle occupant 520 along with voice guidance.

The vehicle occupant 520 may be a person seated in the driver seat, a person seated in the passenger seat, or a person in the rear seat. The vehicle occupant 520 is not limited to the driver.

A voice guidance control device may output voice guidance through a speaker mounted on the seat 530 where the vehicle occupant 520 is seated. The volume level of voice guidance including basic guidance sounds may be adjusted through the display device 540 installed around the vehicle occupant 520. The display device 540 may perform functions beyond adjusting the volume level of the voice guidance, including displaying visual information on the vehicle occupant 520.

The position of the display device 540 may be adjusted such that the display device 540 is within the field of view of the vehicle occupant 520. For example, the position of the display device 540 may be adjusted up or down based on information such as the posture, sitting height, or standing height of the vehicle occupant 520 such that the display screen is within the field of view of the vehicle occupant 520.

Figure 6:
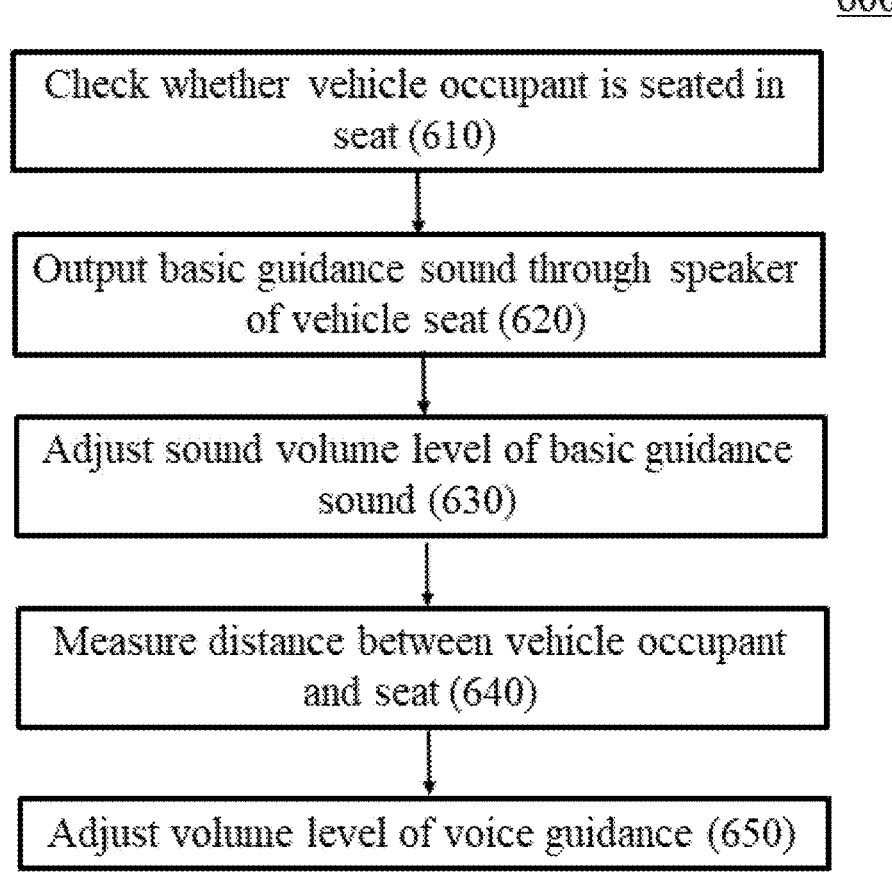
FIG. 6 is a diagram illustrating a process for controlling personalized voice guidance based on changes in the posture of a vehicle occupant according to some embodiments of the present disclosure.

FIG. 6 is a diagram illustrating a process for controlling personalized voice guidance based on changes in the posture of a vehicle occupant according to some embodiments of the present disclosure.

Specifically, controlling the volume level of voice guidance provided to the vehicle occupant depending on the distance between the vehicle occupant and a seat may be performed in the following order:

i) It is checked whether the vehicle occupant is seated in the vehicle seat (610).

ii) Basic guidance sound are output through a speaker of the vehicle seat (620).

iii) The vehicle occupant adjust the sound volume level suitable for the vehicle occupant after hearing the basic guidance sound (630).

iv) The distance between the vehicle occupant and the vehicle seat is measured while the vehicle is driving (640).

v) The personalized voice guidance is provided to the vehicle occupant, and the volume level of the voice guidance is adjusted based on the measured distance (650).

The purpose of the present disclosure is to fully provide voice guidance about the current driving situation of the vehicle to the vehicle occupant. To provide the voice guidance to the vehicle occupant, the volume level may be adjusted based on information on the distance between the vehicle occupant and vehicle seat. Specifically, seating of the vehicle occupant on the seat needs to be confirmed (610).

The seating status of the vehicle occupant may be checked by a voice guidance control device.

The voice guidance control device may be mounted on the backrest portion of the vehicle seat. In particular, ultrasonic waves generated by a distance measuring unit of the voice guidance control device may be used to check the seating status.

In addition, the seating status of the vehicle occupant may also be checked by separate sensing devices installed in the vehicle. These sensing devices may include cameras, light detection and ranging (LiDAR), radio detection and ranging (radar), image sensors, object sensors, and so on. The sensing devices may be positioned either externally or internally within the vehicle.

When the vehicle occupant is seated on the vehicle seat, the basic guidance sounds are output from the speaker of the voice guidance control device (620). The basic guidance sounds serve as a reference point for determining the volume level of the voice guidance provided to the vehicle occupant.

After hearing the basic guidance sounds, the vehicle occupant may adjust the volume level autonomously if the volume level is unsatisfactory (630). The volume level adjustment may be performed through the display device shown in FIG. 5. However, the means of the volume level adjustment are not limited to the display device.

The voice guidance control device may configure the reference volume level and distance for controlling the voice guidance provided through the speaker, based on the distance between the vehicle occupant and the vehicle seat, as well as the volume level of the basic guidance sounds adjusted by the vehicle occupant.

The voice guidance may be provided when the vehicle is driving, when the vehicle is parked, or when the vehicle occupant boards or disembarks from the vehicle. In other words, the timing of providing the voice guidance is not limited to when the vehicle is driving.

The voice guidance control device measures information the distance between the vehicle occupant and the vehicle seat (640). The distance information may be measured based on the time taken for ultrasonic waves output from the distance measuring unit of the voice guidance control device to be transmitted towards the vehicle occupant and then reflected back from the vehicle occupant to the distance measuring unit.

For example, if the speed of ultrasonic waves is 10 m/s and the round-trip time of the ultrasonic waves reflected from the vehicle occupant is 0.02 seconds, the distance from the occupant to the vehicle seat may be measured as 10 cm.

The personalized voice guidance with the adjusted volume level may be provided to the vehicle occupant based on the distance information (650). As the distance between the vehicle occupant and the seat increases, the voice guidance control device may amplify the volume level of the output voice guidance. On the other hand, as the distance between the vehicle occupant and the seat decreases, the voice guidance control device may reduce the volume level of the voice guidance. If there is no change in the distance, the voice guidance with the volume level adjusted by the vehicle occupant when the basic guidance sounds are output may be provided.

The voice guidance may be provided differently depending on each vehicle occupant. This may be called the personalized voice guidance.

For example, a driver driving a vehicle may be provided with voice guidance related to driving, such as information on obstacles around the vehicle, traffic lights, or directions to the destination. Vehicle occupants who are not drivers may be provided with voice guidance related to safety or voice guidance for handling emergency situations. Additionally, if the vehicle occupant is visually impaired, voice guidance may be output to provide information about surrounding objects within the vehicle including seat belts and handles. In other words, different personalized voice guidance may be provided based on the seating position or characteristics of a vehicle occupant in the vehicle.

The voice guidance adjusted based on the distance may be provided until the vehicle occupants disembarks from the vehicle.

Figure 7:
FIG. 7 is a diagram schematically illustrating an example where the volume level of personalized voice guidance is adjusted based on changes in the distance between an occupant and seat according to some embodiments of the present disclosure.
Figure 7:

FIG. 7 is a diagram schematically illustrating an example where the volume level of personalized voice guidance is adjusted based on changes in the distance between an occupant and seat according to some embodiments of the present disclosure.

Referring to FIG. 7A, when a vehicle occupant boards a vehicle, a voice guidance control device measures a reference volume level and distance by outputting basic guidance sounds. The reference volume level and distance may be directly configured by the vehicle occupant. If the vehicle occupant does not configure the reference volume level and distance, the voice guidance control device may also determine as the reference information the volume level of the basic guidance sounds and the distance between the vehicle occupant and vehicle seat when the basic guidance sounds are provided.

Referring to FIG. 7B, when the vehicle occupant changes the posture thereof, the vehicle occupant may move further away from the vehicle seat than the reference distance. In this case, the voice guidance control device may increase the volume level of the voice guidance. This is to ensure that the vehicle occupant fully hears the voice guidance.

As another example, assuming that the reference volume level of the voice guidance is 10 dB and the reference distance is 30 cm in FIG. 7A, if the distance between the vehicle occupant and the vehicle seat increases to 50 cm as in FIG. 7B, the voice guidance may be transmitted at 20 dB. If the vehicle occupant is closely seated with a distance of 10 cm, the voice guidance may be transmitted at 5 dB.

Figure 8:
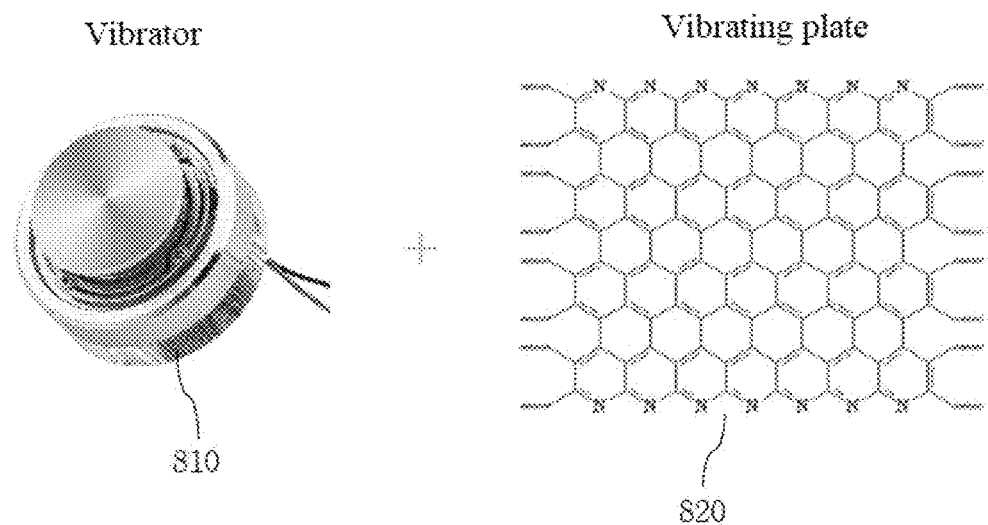
FIG. 8 is a diagram schematically showing the configuration of a vibrator and a vibrating plate included in a speaker of a voice guidance control device according to some embodiments of the present disclosure.

FIG. 8 is a diagram schematically showing the configuration of a vibrator 810 and a vibrating plate 820 included in a speaker of a voice guidance control device according to some embodiments of the present disclosure.

A speaker reproduces sound according to an electrical signal amplified by an amplifier, and the basic principle is to generate sound waves by vibrating the air.

Depending on the reproduction method, speakers may be categorized into electromagnetic, piezoelectric, and electrostatic types.

The speaker, which is a component of the voice guidance control device according to the present disclosure, may include a directional speaker. The directional speaker has the characteristic of outputting sounds only in a specific direction. That is, different personalized voice guidance may be provided to each vehicle occupant seated on a seat equipped with the voice guidance control device through the directional speaker.

Referring to FIG. 8, the vibrator 810 may be a bone conduction speaker that amplifies sound by vibrating objects rather than generating sound itself. The bone conduction speaker may also be referred to as a surface conduction speaker.

The vibrating plate 820 is related to the sound quality of the voice guidance. In this regard, the vibrating plate 820 may include carbon fibers to play a role in equalizing the sound quality. The carbon fiber, which has strong conductivity, may prevent sound from leaking from the speaker in unnecessary directions and maximize vibration by vibrating dense carbon plates. In addition, the vibrating plate 820 made of carbon fibers may produce even sound quality compared to a vibrating plate made of glass.

According to the present disclosure, the speaker may have an internal structure where two or more vibrators are covered by a vibrating plate.

The directivity may be adjusted based on the spacing between vibrators of a speaker, thereby providing personalized voice guidance audible only to occupants sitting in vehicle seats. This will be described in detail with reference to FIG. 9.

Figure 9:
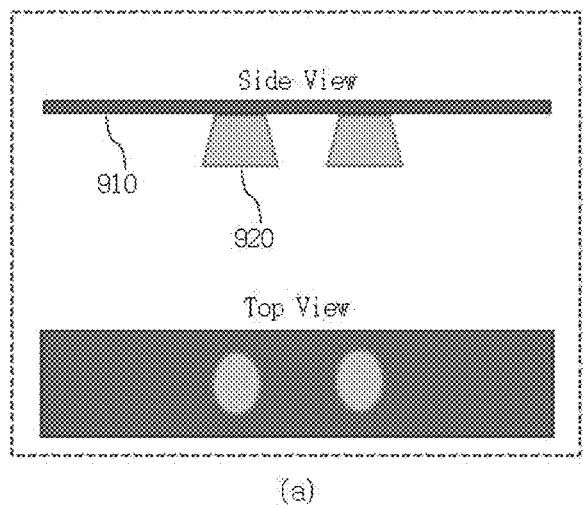
FIG. 9 is a diagram schematically illustrating a method of controlling the sound of personalized voice guidance provided to an occupant based on the spacing between speaker vibrators according to some embodiments of the present disclosure.
Figure 9:
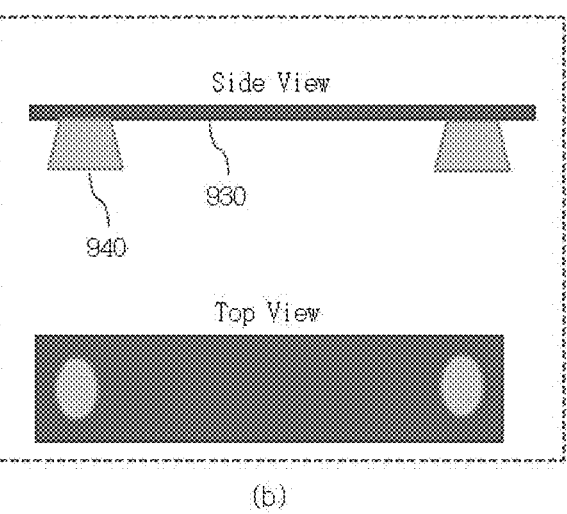

FIG. 9 is a diagram schematically illustrating a method of controlling the sound of personalized voice guidance provided to an occupant based on the spacing between speaker vibrators according to some embodiments of the present disclosure.

Referring to FIG. 9, a speaker according to the present disclosure includes a vibrating plate and two or more vibrators. The vibrating plate is made of carbon fibers, and the spacing of the vibrators may be adjusted to control the directivity of the sound. The directivity of the sound may also be referred to as the concentration of the sound.

Referring to FIG. 9A, the distance between two vibrators attached to the vibrating plate of the speaker may be referred to as a first distance. Referring to FIG. 9B, the distance between two vibrators attached to the vibrating plate of the speaker may be referred to as a second distance. The first distance may be longer than the second distance.

The shorter the distance between vibrators, the more concentrated voice guidance may be provided to a vehicle occupant seated in a vehicle seat.

In other words, if the vibrators are placed at the second distance as shown in FIG. 9B, the voice guidance may be transmitted with a wider dispersion compared to when the vibrators are placed at the first distance as shown in FIG. 9A.

According to the present disclosure, the speaker may adjust the directivity of the voice guidance by adjusting the spacing between the vibrators.

FIG. 10 is a diagram schematically illustrating a method of controlling the volume level of personalized voice guidance based on the distance between an occupant and a vehicle seat according to some embodiments of the present disclosure.

A method of controlling, by a voice guidance control device, a volume level of personalized voice guidance may include: obtaining information on a distance between an occupant of a vehicle and a seat of the vehicle from a signal generated from the vehicle (1010); and outputting voice guidance related to the occupant, wherein a volume level of the output voice guidance may be adaptively determined based on the information on the distance between the occupant and the seat (1020).

As described above, the present disclosure has the following effect: i) even if the distance between a vehicle occupant and a vehicle seat changes due to changes in the posture of the vehicle occupant, voice guidance may be fully provided to the vehicle occupant by adjusting the volume level of the voice guidance based on the distance; ii) voice guidance may be personalized for each occupant seated in the vehicle, thereby providing the guidance tailored to each occupant; and iii) the spacing between speaker vibratos may be adjusted, thereby focusing voice guidance on a vehicle occupant.

The scope of the present disclosure is not limited to the embodiments described above. The scope of the present disclosure includes various modifications and alternatives made by those skilled in the art based on the basic concepts of the present disclosure defined in the following claims.

What is claimed is:

1. A device configured to control a volume level of personalized voice guidance, the device comprising:
a distance measuring unit configured to obtain information on a distance between an occupant of a vehicle and a seat of the vehicle from a signal generated from the vehicle;
a speaker configured to output voice guidance related to the occupant;
a display device configured to receive, when the distance between the occupant and the seat of the vehicle is a reference distance, an input from the occupant; and
a controller configured to set a reference volume level of the speaker based on the input, and adaptively increase a volume level of the speaker with respect to the reference volume level when the distance between the occupant and the seat increases with respect to the reference distance and adaptively decrease the volume level of the speaker with respect to the reference volume level when the distance between the occupant and the seat decreases with respect to the reference distance.

2. The device of claim 1, wherein based on that there are two or more occupants in the vehicle, the controller outputs voice guidance personalized for each of the two or more occupants.

3. The device of claim 1, wherein the signal generated from the vehicle includes an ultrasonic signal transmitted from the distance measuring unit mounted on the seat of the vehicle, and
wherein the distance measuring unit determines the distance information based on information on a round-trip time of the ultrasonic signal reflected by the occupant.

4. The device of claim 1, wherein a location at which the voice guidance is output corresponds to the speaker mounted on the seat.

5. The device of claim 1, wherein the speaker includes at least one directional speaker, and
wherein the directional speaker includes a vibrator and a vibrating plate.

6. The device of claim 5, wherein the vibrator related to concentration of the voice guidance includes two or more bone conduction speakers, and wherein the concentration of the voice guidance is determined based on a spacing between the bone conduction speakers.

7. The device of claim 5, wherein the vibrating plate related to sound quality of the voice guidance includes carbon fibers.

8. The device of claim 1, wherein the distance measuring unit and the speaker are mounted on the seat.

9. A method of controlling, by a voice guidance control device, a volume level of personalized voice guidance, the method comprising:

obtaining information on a distance between an occupant of a vehicle and a seat of the vehicle from a signal generated from the vehicle;

outputting, by a speaker, voice guidance related to the occupant;

receiving, by a display device, when the distance between the occupant and the seat of the vehicle is a reference distance, an input from the occupant;

setting a reference volume level of the speaker based on the input; and adaptively increasing a volume level of the speaker with respect to the reference volume level when the distance between the occupant and the seat increases with respect to the reference distance, and adaptively decreasing the volume level of the speaker with respect to the reference volume level when the distance between the occupant and the seat decreases with respect to the reference distance.

10. The method of claim 9, wherein there are two or more occupants in the vehicle, and wherein the voice guidance is voice guidance personalized for each of the two or more occupants.

11. The method of claim 9, wherein the signal generated from the vehicle includes an ultrasonic signal transmitted from a device mounted on the seat of the vehicle, and wherein the distance information is determined based on information on a round-trip time of the ultrasonic signal reflected by the occupant.

12. The method of claim 9, wherein a location at which the voice guidance is output corresponds to the speaker mounted on the seat.

13. The method of claim 9, wherein a speaker includes at least one directional speaker, and wherein the directional speaker includes a vibrator and a vibrating plate.

14. The method of claim 13, wherein the vibrator related to concentration of the voice guidance includes two or more bone conduction speakers, and wherein the concentration of the voice guidance is determined based on a spacing between the bone conduction speakers.

15. The method of claim 13, wherein the vibrating plate related to sound quality of the voice guidance includes carbon fibers.

* * * * *